(12) United States Patent
Jansen et al.

(10) Patent No.: US 8,081,885 B2
(45) Date of Patent: Dec. 20, 2011

(54) COHERENT OPTICAL COMMUNICATION APPARATUS AND METHOD

(75) Inventors: Sander Lars Jansen, Saitama (JP); Itsuro Morita, Saitama (JP)

(73) Assignee: KDDI Corporation, Tokyo (JP)

( * ) Notice: Subject to any disclaimer, the term of this patent is extended or adjusted under 35 U.S.C. 154(b) by 867 days.

(21) Appl. No.: 12/037,375

(22) Filed: Feb. 26, 2008

(65) Prior Publication Data

US 2008/0232823 A1 Sep. 25, 2008

(30) Foreign Application Priority Data

Mar. 23, 2007 (JP) ................................. 2007-076428

(51) Int. Cl.
*H04B 10/06* (2006.01)
*H04B 10/04* (2006.01)
(52) U.S. Cl. ........................................ 398/203; 398/208
(58) Field of Classification Search ............ 398/202–214
See application file for complete search history.

(56) References Cited

U.S. PATENT DOCUMENTS

| 7,346,279 | B1 * | 3/2008 | Li et al. ........................... 398/32 |
| 2003/0112855 | A1 * | 6/2003 | Margulis et al. .............. 375/147 |

OTHER PUBLICATIONS

Christopher Wree; "Measured Noise Performance for Heterodyne Detection of 10-Gb/s OOK and DPSK;" *IEEE Photonics Technology Letters*; vol. 19, No. 1, Jan. 1, 2007.

Satoshi Tsukamoto et al.; "Coherent Demodulation of Optical Multilevel Phase-Shift-Keying Signals Using Homodyne Detection and Digital Signal Processing;" *IEEE Photonics Technology Letters*; vol. 18, No. 10; May 15, 2006.

* cited by examiner

*Primary Examiner* — Kenneth N Vanderpuye
*Assistant Examiner* — Daniel Dobson
(74) *Attorney, Agent, or Firm* — Oliff & Berridge, PLC

(57) ABSTRACT

The present invention relates to a coherent optical communication apparatus and method. According to the invention, the optical communication apparatus receives a modulated optical signal, which is generated by modulating an optical signal with a first electrical signal obtained by adding a second electrical signal carrying information to be transmitted and a reference electrical signal, and converts the modulated optical signal to a third electrical signal by coherent detection. Then the apparatus detects an amount of fluctuation of the reference electrical signal included in the third electrical signal, and compensates the second electrical signal included in the third electrical signal using the amount of fluctuation.

4 Claims, 4 Drawing Sheets

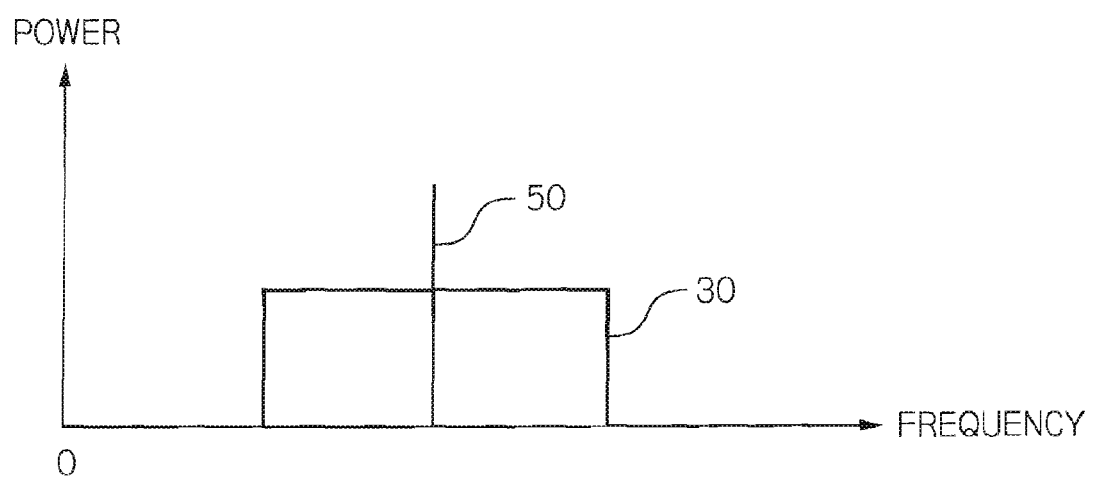

COHERENT OPTICAL COMMUNICATION APPARATUS AND METHOD

PRIORITY CLAIM

This application claims priority from Japanese patent application No. 2007-076428 filed on Mar. 23, 2007, which is incorporated herein by reference.

BACKGROUND OF THE INVENTION

1. Field of the Invention

The present invention relates to a coherent optical communication apparatus and method.

2. Description of the Related Art

A coherent optical communication system is a system, in which a continuous wave signal from a laser diode is modulated with an electrical signal carrying information to be transmitted using amplitude modulation, frequency modulation and/or phase modulation at the transmitting side. The modulated optical signal from the transmitting side and a local oscillator signal are coupled for optical detection at the receiving side. In case the frequency of the local oscillator signal is the same as the optical carrier of the modulated optical signal, it is called homodyne detection, or in some cases intradyne detection. In case the frequency of the local oscillator signal is different from the one of the carrier component, it is called heterodyne detection.

In case of heterodyne detection, a detector outputs an electrical IF (Intermediate Frequency) signal. The IF is equal to the frequency difference between the carrier of the modulated optical signal and the local oscillator signal. In case of homodyne/intradyne detection, the detector directly outputs an electrical baseband signal. In coherent optical communication systems, it is required to synchronize the frequency of the local oscillator signal with the modulated optical signal to be received for a correct demodulation process at the receiving side. For this purpose, Christoph Wree et al, "Measured Noise Performance for Heterodyne Detection of 10-Gb/s OOK and DPSK", IEEE PHOTONICS TECHNOLOGY LETTERS Vol. 19, No. 1, pp. 15-17, January 2007, discloses a configuration that has an AFC (Automatic Frequency Control) loop for controlling the frequency of the local oscillator signal.

However, it requires a high-performance AFC loop to realize the frequency control of the local oscillator signal, and therefore it makes the optical communication apparatus expensive. To solve the above mentioned problem, Satoshi Tsukamoto et al., "Coherent Demodulation of Optical Multilevel Phase-Shift-Keying Signals Using Homodyne Detection and Digital Signal Processing", IEEE PHOTONICS TECHNOLOGY LETTERS Vol. 18, No. 10, pp. 1131-1133, May 2006, discloses a demodulation configuration without using a high-performance AFC loop or an optical PLL (Phase Lock Loop). The above document relates to a coherent optical communication system using M-ary DPSK (Differential Phase Shift Keying) modulation, where M equals to power of two. According to the above document, each symbol of an electrical signal obtained by the coherent optical detection is raised to the M-th power, the phase error is estimated using an average of several successive symbols, and then the signal is demodulated using the estimated phase error.

However, the average value needs to be divided by M to compensate the calculation of the M-th power. Therefore, if the phase error is not within a range of $-\pi/M$ to $+\pi/M$, it is not possible to compensate it correctly. Further it can be applied only to the optical communication system, which uses M-ary DPSK modulation.

SUMMARY OF THE INVENTION

The invention has been made in view of the above-mentioned problem, and it is therefore an object of the present invention to provide a coherent optical communication apparatus and method, which require neither an AFC loop nor an optical PPL, can be used with any modulation technique, and has no phase error range limitation.

According to the present invention, an optical communication apparatus receives a modulated optical signal, which is generated by modulating an optical signal with a first electrical signal, where the first electrical signal is obtained by adding a second electrical signal carrying information to be transmitted and a reference electrical signal that has a predetermined frequency. The predetermine frequency includes 0 Hz. The optical communication apparatus has an optical signal generator for generating a local oscillator signal, a hybrid for coupling the modulated optical signal with the local oscillator signal, an optical electrical converter for converting an output signal from the coupler to a third electrical signal and a compensator. The compensator detects an amount of fluctuation of the reference electrical signal included in the third electrical signal, and compensates the second electrical signal included in the third electrical signal using the amount of fluctuation.

According to the present invention, an optical communication method includes the steps of generating a modulated optical signal by modulating an optical signal with a first electrical signal at a transmitting side, where the first electrical signal is obtained by adding an a second electrical signal carrying information to be transmitted and a reference electrical signal with predetermined frequency. At a receiving side, the method includes the steps of generating a third electrical signal by optical electrical conversion of an optical signal obtained by coupling the modulated optical signal and a local oscillator signal, detecting an amount of fluctuation of the reference electrical signal included in the third electrical signal, and compensating the second electrical signal included in the third electrical signal using the amount of fluctuation.

Advantageously the amount of fluctuation is based on an amplitude value and/or a phase value of the reference electrical signal. Favorably the compensation is performed by multiplying the second electrical signal by a signal, of which complex expression is based on an inverse value of the amount of fluctuation.

According to the invention, the relative fluctuation between the local oscillator signal and the modulated optical signal is detected at the receiving side using the reference electrical signal inserted at the transmitting side, and the fluctuation is compensated in electrical domain. Therefore, it is possible to demodulate the modulated optical signal correctly without controlling the local oscillator signal by the modulated optical signal. The invention has no restriction on the modulation format and compensation range as well as the electrical signal that carries information. Further it is possible to compensate the fluctuation caused by noise components included in the local oscillator signal as well.

Further objects and advantages of the present invention will be apparent from the following description of the preferred embodiments of the invention as illustrated in the accompanying drawings.

BRIEF DESCRIPTION OF THE DRAWINGS

FIG. 5 is a schematic view of a signal spectrum obtained by adding a reference signal to an electrical signal according to another embodiment of the invention.

DETAILED DESCRIPTION OF THE INVENTION

Figure 1:
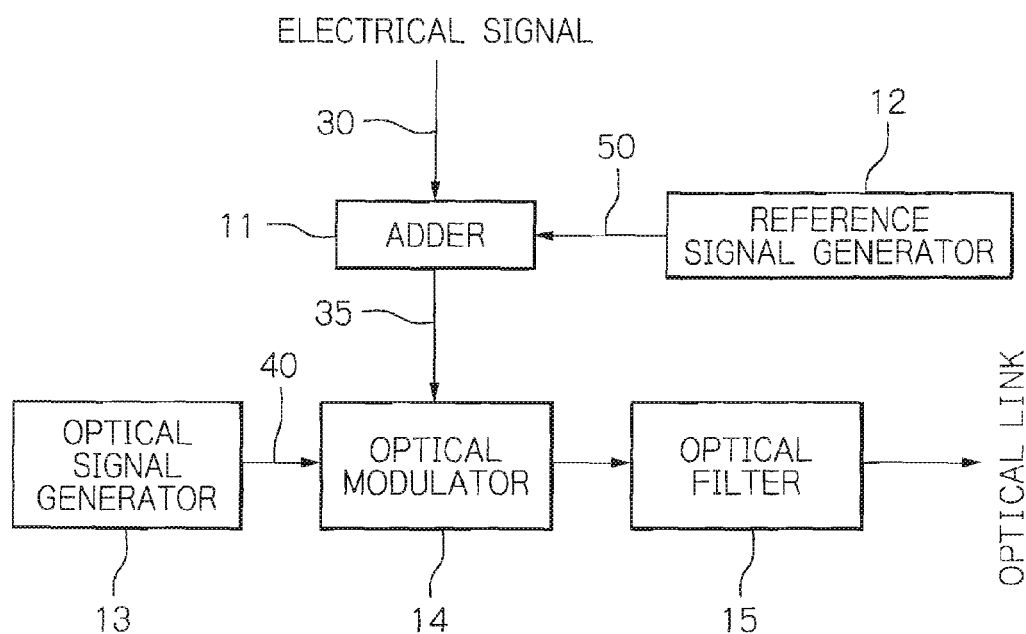
FIG. 1 shows a block diagram of a transmitting side of an optical communication apparatus according to the invention.

FIG. 1 shows a block diagram of a transmitting side of an optical communication apparatus according to the invention. According to FIG. 1, the optical communication apparatus includes an adder 11, a reference signal generator 12, an optical signal generator 13, an optical modulator 14 and an optical filter 15.

Figure 2:
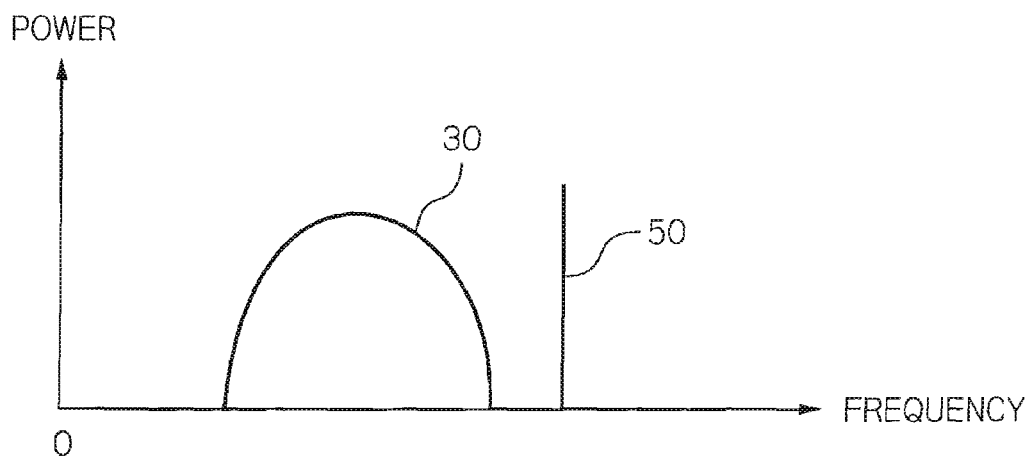
FIG. 2 is a schematic view of a signal spectrum obtained by adding a reference signal to an electrical signal.

The reference signal generator 12 generates a reference signal 50, which is a sinusoidal signal, and the adder 11 adds the reference signal 50 and an electrical signal 30, which carries information. The electrical signal 30 is, for example, a pulse signal, a sub-carriers multiplexed signal used in SCM (Sub-Carrier Multiplexing) system, a modulated signal of a single carrier converted to RF (Radio Frequency) band or an OFDM (Orthogonal Frequency Division Multiplexing) signal, and the frequency of the reference signal 50 is chosen in such a way that the reference signal 50 does not interfere with the electrical signal 30, for example the reference signal 50 is placed outside of the electrical signal 30. Favorably the frequency of the reference signal 50 is chosen as close as possible to the electrical signal 30 to the extent that the reference signal 50 does not interfere with the electrical signal 30. However the DC signal can be used as the reference signal 50 as well. The reference signal 50 can be generated independently from the electrical signal 30, i.e. the reference signal 50 is not required to synchronize with the electrical signal 30. FIG. 2 is a schematic view of a spectrum of the signal output by the adder 11.

The optical signal generator 13 is, for example, a distributed feedback laser diode, and generates a CW (continuous wave signal) 40 with a predetermined frequency. The optical modulator 14 is, for example, a Mach-Zehnder modulator, modulates the CW 40 from the optical generator 13 with the electrical signal 35 output by the adder 11 using for example amplitude modulation technique, and outputs the modulated optical signal.

The optical filter 15 is provided, in case the SSB (Single Side Band) is used, and outputs a modulated optical signal, which one side band or a carrier component/one sideband is suppressed, to an optical link. Off course it is possible to generate a SSB optical signal directly by the optical modulator 14.

Figure 3:
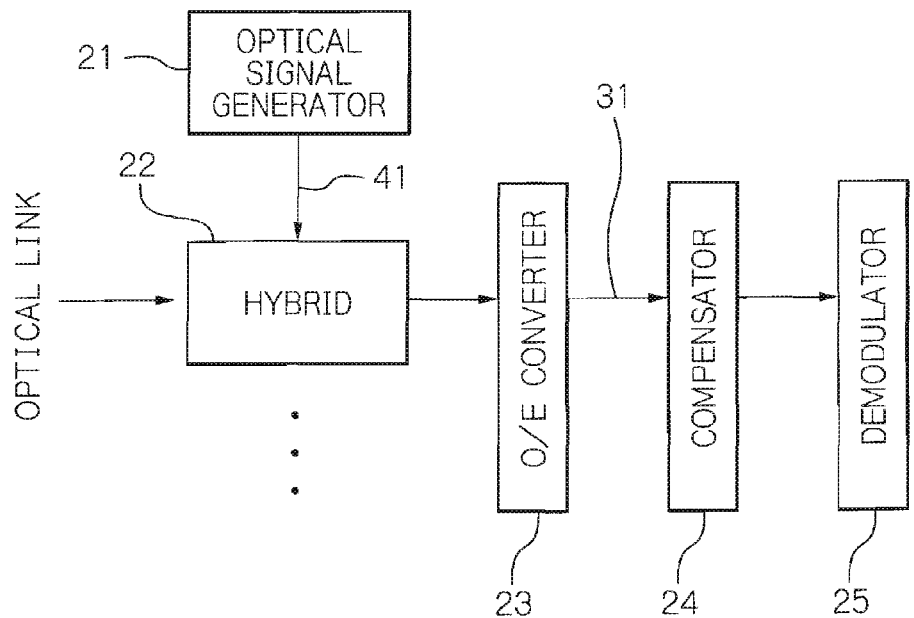
FIG. 3 shows a block diagram of a receiving side of the optical communication apparatus according to the invention.

FIG. 3 shows a block diagram of a receiving side of the optical communication apparatus according to the invention. According to FIG. 3, the optical communication apparatus includes an optical signal generator 21, an optical hybrid 22, an optical electrical converter 23, a compensator 24 and a demodulator 25.

The optical signal generator 21 is, for example, a distributed feedback laser diode, and generates a CW 41 having a predetermined frequency, which is different from the one of the CW 40. The CW 41 is normally referred as a local oscillator signal 41. The optical hybrid 22 couples the modulated optical signal from a remote optical communication apparatus with the local oscillator signal 41. The optical electrical converter 23 is, for example, a photo diode, and converts an optical signal from the optical coupler 22 to a detected electrical signal 31, which is a IF signal. That is, the optical communication apparatus according to the embodiment uses a heterodyne detection.

According to the invention, the CW 41 is not controlled by the modulated optical signal from the remote optical communication apparatus. That is, the optical signal generator 21 is not synchronized with the optical signal generator 13 of the remote optical communication apparatus, and the frequency difference between the CW 40 and the CW 41 vary, not constant. Further, the CWs 40 and 41 have noise components. As a result, the detected electrical signal 31 from the optical electrical converter 23 has fluctuation/variation caused by the frequency difference variation and noise components of the CWs 40 and 41. The compensator 24 detects the fluctuation/variation, removes the fluctuation/variation, i.e. compensates the detected electrical signal 31, and outputs the compensated electrical signal to the demodulator 25.

Figure 4:
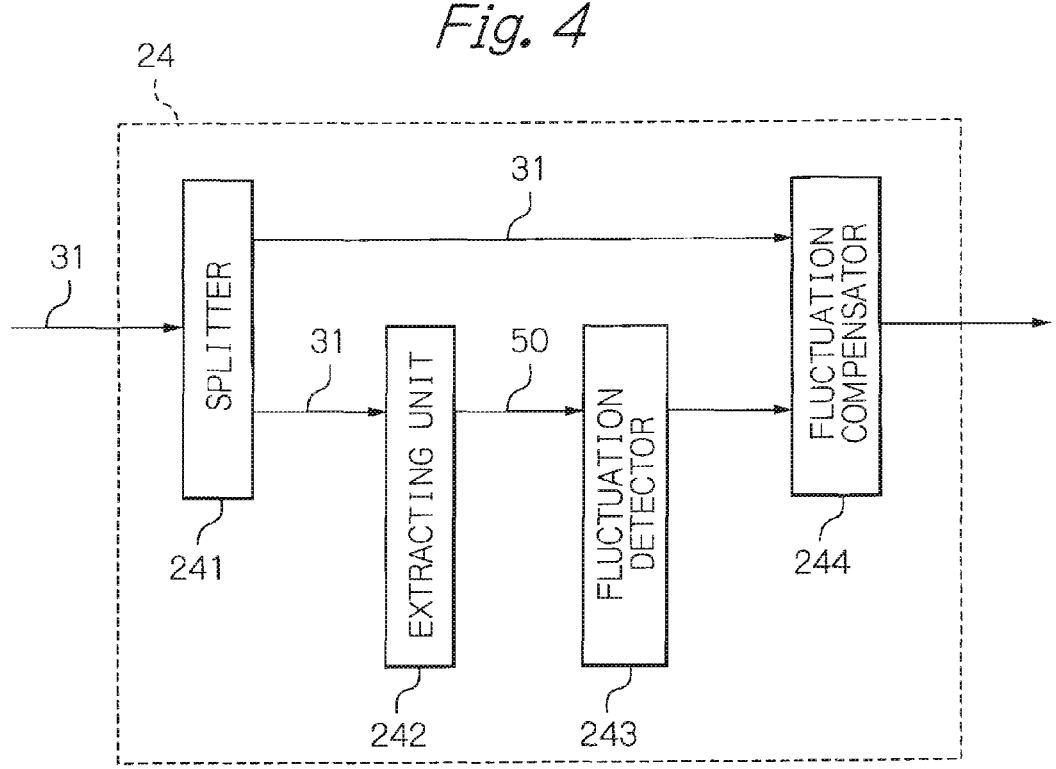
FIG. 4 shows a block diagram of a compensator according to the invention.

FIG. 4 shows a block diagram of the compensator 24. According to FIG. 4, the compensator 24 includes a splitter 241, an extracting unit 242, a fluctuation detector 243 and a fluctuation compensator 244.

The splitter 241 splits the detected electrical signal 31 from the optical electrical converter 23, and the extracting unit 242 extracts the reference signal 50 from the detected electrical signal 31. The fluctuation detector 243 detects the fluctuation of the reference signal 50, for example, by comparing a sinusoidal signal generated by an internal electrical oscillator in the fluctuation detector 243 with the extracted reference signal 50, and outputs a signal indicating an amount of fluctuation. Since fluctuation of the electrical oscillator is normally too small compared to fluctuation between the optical signal generators such as laser diodes, the signal generated by the internal electrical oscillator is not required to synchronize with the receiving signal.

The fluctuation compensator 244 compensates frequency fluctuation of the detected electrical signal 31 based on the signal indicating the amount of fluctuation output by the fluctuation detector 243. As a result, a signal output by the fluctuation compensator 244 has less fluctuation. That is, the signal output by the fluctuation compensator 244 equivalents to a signal obtained by using an AFC or an optical PPL as the prior art does, and it is possible to use conventional demodulators for the demodulator 25. In another embodiment, the fluctuation compensator 244 compensates the electrical signal 30 included in the detected electrical signal 31, which is obtained by filtering out the reference signal 50 from the detected electrical signal 31, using the amount of the fluctuation.

In the embodiment, the fluctuation compensation is preformed in IF band, however, the invention is not limited to the embodiment, and it is possible to perform the fluctuation compensation against a baseband signal after frequency conversion of the detected electrical signal 31 in IF band. Further, the invention is not limited to the heterodyne detection. As the person in the art can easily understand, the invention can be applied to homodyne/intradyne detection as well. In this case, the fluctuation compensation is also preformed against a baseband signal.

Preferably, the detected electrical signal 31 is converted to a digital signal by an analog digital converter, and the compensator 24 and the demodulator 25 are realized in digital domain, for example, by use of a DSP (Digital Signal Processor).

Figure 6A:
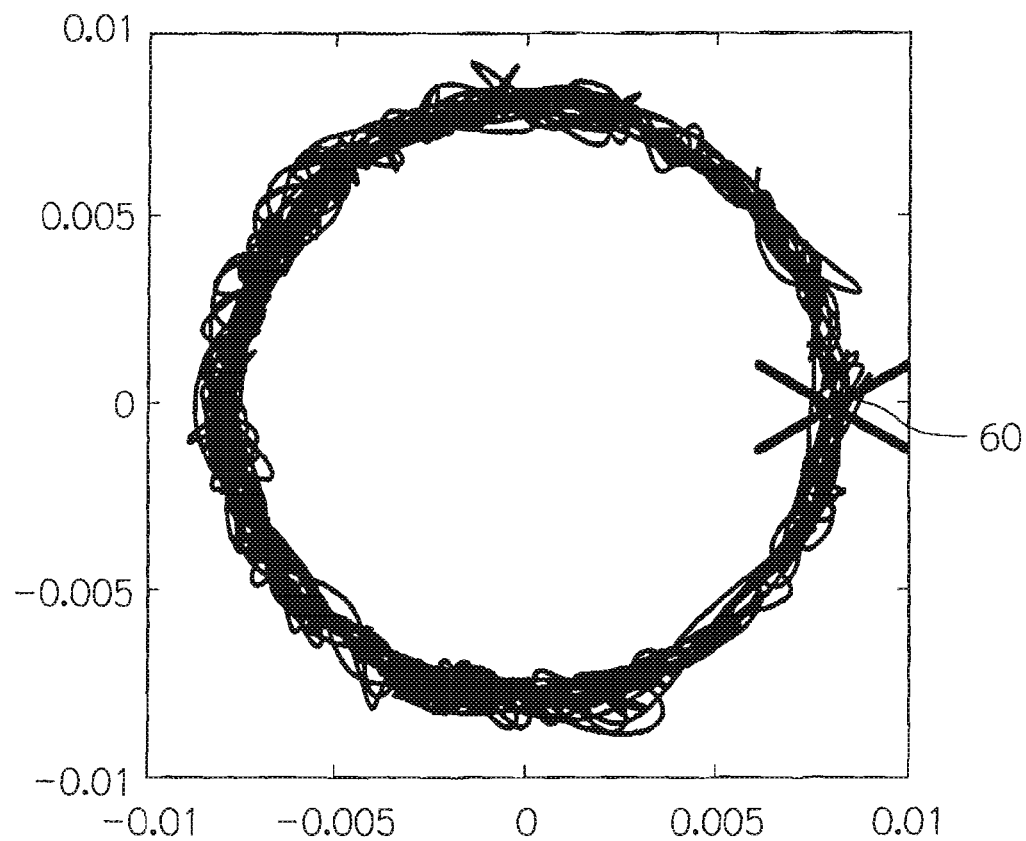
FIGS. 6A and 6B are explanation drawings of a method according to the invention.
Figure 6B:
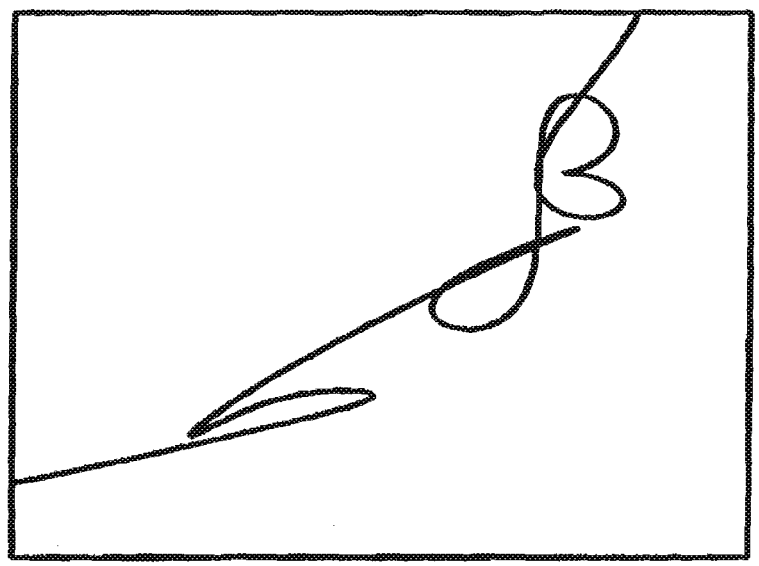

FIGS. 6A and 6B are explanation drawings of a method according to the invention. FIG. 6A shows plots on the complex plane of the reference signal 50 observed at the receiving side using the internal electrical oscillator of the receiving side as a reference. FIG. 6B is an enlarged view of one portion of the FIG. 6A. If the CWs 40 and 41 are synchronized, and have no phase noise, all plots are located on the same one point, for example a point 60 in FIG. 6A. However, the CW 41 is not synchronized with the CW 40 according to the invention. As a result, phase change occurs, and plots are distributed around a circle. Further, due to frequency difference fluctuation between the CWs 40 and 41 as well as the phase noise of the CWs 40 and 41, the phase and amplitude of the reference signal 50 observed in the receiving side is irregularly changing.

For example, the fluctuation detector 243 periodically performs discrete Fourier transform of the reference signal 50, calculates an amplitude and a phase of the reference signal 50 in each period, and outputs the amplitude $\alpha$ and the phase $\theta$ as the amount of fluctuation to the fluctuation compensator 244. More specifically, if the amplitude of the in-phase component of the reference signal 50 is A, and the amplitude of the quadrature component of the reference signal 50 is B in a period, then the amount of fluctuation of the period is A+jB, and A+jB is notified to the fluctuation compensator 244. Here, $\alpha^2=A^2+B^2$, and tan $\theta=B/A$. Also it is possible to use only the phase $\theta$ for the amount of fluctuation.

The fluctuation compensator 244 compensates the detected electrical signal 31 in a period using a value, which is an inverse of the amount of fluctuation in the same period informed by the fluctuation detector 243. More precisely, if A+jB is informed from the fluctuation detector 243 in a period, the fluctuation compensator 244 multiply a signal, which complex expression is $A/(A^2+B^2)-jB/(A^2+B^2)$, i.e. inverse of A+jB, by the detected electrical signal 31 in the same period. It is also possible to modify the inverse value, for example based on the frequency difference between the reference signal 50 and the electrical signal 30. That is, a value based on the inverse of the amount of fluctuation can be used for compensation.

By the processes described above, it is possible to remove fluctuation of the detected electrical signal 31 caused by the local oscillator signal 41, which have phase noise and is generated asynchronously from the modulated optical signal. A sampling clock signal used to digitize the detected electrical signal 31 is also generated independently from the modulated optical signal, because fluctuation of the electrical oscillator, which generates the sampling clock, is normally too small compared to the one of the optical signal generators.

In case the electrical signal 30 is an OFDM signal, one sub-carrier in the OFDM signal can be used as the reference signal 50, which is used to detect relative fluctuation between the CW 40 and the CW 41. FIG. 5 is a schematic view of a signal spectrum output by the adder 11, in case the electrical signal 30 is an OFDM signal of RF band. Here, the center sub-carrier of the OFDM signal is used as the reference signal 50. In other word, a DC position of the baseband OFDM signal is used as the reference signal 50. In this case, the reference signal 50 can be added to the OFDM signal 30 by applying a DC offset to the baseband OFDM signal 30. It is also possible to add the reference signal 50 to the OFDM signal in inverse discrete Fourier transform operation.

Further, if the electrical signal 30 includes a plurality of sub-carriers, such as SCM or OFDM, the fluctuation compensator 244 preferably modifies the inverse value of the amount of fluctuation for each sub-carrier based on the frequency position of each sub-carrier. Further, if the electrical signal 30 is a SCM signal, it is preferable to add the reference signal 50 for each sub-carrier.

Many modifications and variations will be apparent those of ordinary skilled in the art. The embodiments was chosen and described in order to best explain the principles of the invention. It should be understood that the present invention is not limited to the specific embodiments described in the specification, except as defined in the appended claims.

The invention claimed is:

1. An optical communication apparatus receiving a modulated optical signal, the modulated optical signal being generated by modulating an optical signal with a first electrical signal, the first electrical signal being obtained by adding a second electrical signal carrying information to be transmitted and a reference electrical signal with predetermined frequency, the optical communication apparatus comprising:
   means for generating a local oscillator signal;
   means for coupling the modulated optical signal and the local oscillator signal;
   means for converting an output signal from the coupling means to a third electrical signal by optical electrical conversion;
   means for detecting an amount of fluctuation of the reference electrical signal included in the third electrical signal; and
   means for compensating the second electrical signal included in the third electrical signal using the amount of fluctuation,
   wherein the compensating means multiplies the second electrical signal by a signal, of which complex expression is based on an inverse value of the amount of fluctuation, and
   wherein the amount of fluctuation is based on an amplitude value of the reference electrical signal.

2. The optical communication apparatus according to claim 1, wherein the amount of fluctuation is based on the amplitude value and a phase value of the reference electrical signal.

3. An optical communication method, comprising the steps of:
   generating a modulated optical signal by modulating an optical signal with a first electrical signal at a transmitting side, the first electrical signal being obtained by adding a second electrical signal carrying information to be transmitted and a reference electrical signal with predetermined frequency,
   generating a third electrical signal by optical electrical conversion of an optical signal obtained by coupling the modulated optical signal and a local oscillator signal at a receiving side;
   detecting an amount of fluctuation of the reference electrical signal included in the third electrical signal; and
   compensating the second electrical signal included in the third electrical signal using the amount of fluctuation,
   wherein the second electrical signal is multiplied by a signal, of which complex expression is based on an inverse value of the amount of fluctuation in the compensating step, and
   wherein the amount of fluctuation is based on an amplitude value of the reference electrical signal.

4. The optical communication method according to claim 3, wherein the amount of fluctuation is based on the amplitude value and a phase value of the reference electrical signal.

* * * * *